(12) United States Patent
Pensack-Rinehart et al.

(10) Patent No.: US 9,417,777 B2
(45) Date of Patent: Aug. 16, 2016

(54) ENABLING QUICK DISPLAY TRANSITIONS BETWEEN INDOOR AND OUTDOOR MAP DATA

(71) Applicant: GOOGLE INC., Mountain View, CA (US)

(72) Inventors: Seth Jacob Pensack-Rinehart, Tokyo (JP); Gavin Reaney, Tokyo (JP); Yatin Chawathe, Mountain View, CA (US); Nicholas Lee, Mountain View, CA (US); Sascha Benjamin Brawer, Mountain View, CA (US); Paul Messmer, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 176 days.

(21) Appl. No.: 14/167,496

(22) Filed: Jan. 29, 2014

(65) Prior Publication Data

US 2015/0020008 A1    Jan. 15, 2015

Related U.S. Application Data

(60) Provisional application No. 61/844,300, filed on Jul. 9, 2013.

(51) Int. Cl.
*G06F 3/0484* (2013.01)
*G09B 29/10* (2006.01)
*H04L 29/08* (2006.01)
(Continued)

(52) U.S. Cl.
CPC .......... *G06F 3/04847* (2013.01); *G01C 21/206* (2013.01); *G01C 21/32* (2013.01); *G09B 29/106* (2013.01); *H04L 67/18* (2013.01)

(58) Field of Classification Search
CPC .................................................... G06F 3/04847
USPC .......................................................... 715/765
See application file for complete search history.

(56) References Cited

U.S. PATENT DOCUMENTS 8,434,029 B2 *   4/2013   Albright .............. G01C 21/206
                                                            701/409
8,464,181 B1 *   6/2013   Bailiang ............. G06F 3/04815
                                                            715/848
(Continued)

OTHER PUBLICATIONS

Screenshot of Google Maps 6.0 features posted by Gadget Shooter, available online at <https://www.youtube.com/watch?v=ubU5RFovOgo>, Published on Nov. 29, 2011, 18 pages.*

*Primary Examiner* — Reza Nabi
(74) *Attorney, Agent, or Firm* — Marshall, Gerstein & Borun LLP

(57) ABSTRACT

A map data server may provide metadata about available indoor map data that accompanies map data for drawing a base map. For example, map data may include vector data for drawing a footprint of a building, and the metadata may include information about the physical properties of the building (e.g., an indication of how many floors the building has and if detailed map data is available for the indicated floors, etc.). A mapping application running on the client can use this metadata to display an interface that allows a user to select floors or otherwise interact with the floor data. Further, the metadata accompanying map data can include a bounding box, or a bounding polygon, for one or more floors. The mapping application can use these bounding shapes to properly reposition the viewport as map data for a new floor is being loaded, for example.

21 Claims, 6 Drawing Sheets

(51) Int. Cl.
*G01C 21/20* (2006.01)
*G01C 21/32* (2006.01)

(56) References Cited

U.S. PATENT DOCUMENTS

| | | | | |
|---|---|---|---|---|
| 8,490,025 B2* | 7/2013 | Jakobson | | G01C 21/3682 715/712 |
| 8,823,734 B1* | 9/2014 | Bailiang | | G06T 17/05 345/418 |
| 8,928,657 B2* | 1/2015 | Bailiang | | G06T 15/08 345/419 |
| 2008/0072284 A1* | 3/2008 | Horvitz | | G06F 17/30241 726/2 |
| 2008/0267145 A1* | 10/2008 | Vangati | | H04L 41/12 370/338 |
| 2009/0018844 A1* | 1/2009 | Baker | | G06Q 50/184 705/310 |
| 2009/0157744 A1* | 6/2009 | McConnell | | G06F 17/30241 |
| 2009/0319595 A1* | 12/2009 | Millmore | | H04L 67/24 709/201 |
| 2010/0008337 A1* | 1/2010 | Bajko | | H04W 64/00 370/338 |
| 2010/0013931 A1* | 1/2010 | Golan | | G06K 9/00771 348/150 |
| 2010/0146436 A1* | 6/2010 | Jakobson | | G01C 21/3682 715/800 |
| 2011/0096091 A1* | 4/2011 | Milewski | | G09B 29/007 345/629 |
| 2012/0050332 A1* | 3/2012 | Nikara | | G06F 3/0481 345/660 |
| 2013/0006525 A1* | 1/2013 | Stroila | | G01C 21/20 701/434 |
| 2013/0047120 A1* | 2/2013 | Albright | | G01C 21/206 715/810 |
| 2013/0054573 A1* | 2/2013 | Snellman | | G06F 17/30554 707/722 |
| 2013/0226451 A1* | 8/2013 | O'Neill | | G01C 21/206 701/450 |
| 2014/0005809 A1* | 1/2014 | Frei | | H04L 29/1249 700/90 |
| 2014/0018096 A1* | 1/2014 | Jagannath | | H04W 4/021 455/456.1 |
| 2014/0053077 A1* | 2/2014 | Unnikrishnan | | G06F 3/04815 715/747 |
| 2014/0128093 A1* | 5/2014 | Das | | H04W 64/006 455/456.1 |
| 2014/0153773 A1* | 6/2014 | Gupta | | G06K 9/6202 382/103 |
| 2014/0171068 A1* | 6/2014 | Marti | | G01S 1/047 455/427 |
| 2014/0237076 A1* | 8/2014 | Goldman | | G06F 17/3087 709/217 |
| 2014/0253538 A1* | 9/2014 | Bailiang | | G06T 15/08 345/419 |
| 2014/0253582 A1* | 9/2014 | Chen | | G09G 5/30 345/594 |
| 2015/0020008 A1* | 1/2015 | Pensack-Rinehart | | G06F 3/04847 715/765 |
| 2015/0095350 A1* | 4/2015 | Chen | | G06F 17/27 707/749 |
| 2015/0109338 A1* | 4/2015 | McKinnon | | G06F 17/30265 345/633 |
| 2015/0153180 A1* | 6/2015 | Ettinger | | G01C 21/206 701/410 |
| 2015/0168159 A1* | 6/2015 | Chao | | G01C 21/30 701/428 |
| 2015/0193416 A1* | 7/2015 | Hagiwara | | G06F 17/241 715/202 |
| 2015/0237164 A1* | 8/2015 | Mohammad Mirzaei | | H04W 4/04 715/202 |
| 2015/0269824 A1* | 9/2015 | Zhang | | G08B 21/0438 340/539.12 |

* cited by examiner

ENABLING QUICK DISPLAY TRANSITIONS BETWEEN INDOOR AND OUTDOOR MAP DATA

CROSS REFERENCE TO RELATED APPLICATIONS

This application claims the benefit of U.S. Provisional Patent Application No. 61/844,300 that was filed on Jul. 9, 2013 the disclosure of which is hereby incorporated herein by reference in its entirety for all purposes.

FIELD OF THE DISCLOSURE

The present disclosure relates to interactive digital maps and, more particularly, to providing a widget to allow quick transitions to indoor map data on a client computing device displaying a base map that includes both outdoor and indoor map data.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A wide variety of computing devices, including many portable devices, support software applications that display interactive digital maps ("mapping applications"). For example, mapping applications may run on laptop and tablet computers, mobile phones, car navigation systems, handheld global positioning system (GPS) units, etc. These mapping applications can display various types of geographic data including topographical data, street data, urban transit information, and traffic data, in a two-dimensional (2D) or three-dimensional (3D) format.

Although digital maps usually depict "outdoor" map features such as buildings, roads, bodies of water, etc., indoor mapping is also becoming available. For example, a digital map that depicts the footprint of an indoor shopping mall at certain zoom levels can also depict the floor plan of the shopping mall, icons for indoor facilities such as restrooms and elevators, and text labels for various businesses.

In a typical system, indoor map data is stored in a separate database and provided to a client device as a separate layer of data that can be overlaid on a digital map. A mapping application executing on the client device renders a digital map with external features such as roads, parks, bodies of water, building footprints, etc. and, when the user zooms in on a building footprint, generates a separate request (possibly to a separate server) to retrieve indoor map data. As a result, prior to receiving the requested indoor data, the mapping application cannot display any information or controls related to the indoor data. For example, the mapping application cannot display a widget for selecting a floor of a multi-floor building.

SUMMARY

The features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

A map data server may provide metadata about available indoor map data that accompanies map data for drawing a base map. For example, map data may include vector data for drawing a footprint of a building, and the metadata may include information about the physical properties of the building (e.g., an indication of how many floors the building has and if detailed map data is available for the indicated floors, etc.). A mapping application running on the client can use this metadata to display an interface that allows a user to select floors or otherwise interact with the floor data. Further, the metadata accompanying map data can include a bounding box, or a bounding polygon, for one or more floors. The mapping application can use these bounding shapes to properly reposition the viewport as map data for a new floor is being loaded, for example.

In a first embodiment, a computer-implemented method in a network server may enable quick transitions to indoor map data from a base map displaying outdoor map data. The method may receive, from the client device, a request for map data for a specified geographic area and a specified zoom level. The method may then retrieve outdoor map data for the requested geographic area at the zoom level. The outdoor map data may correspond to externally-visible physical entities. The method may also determine that the outdoor map data includes a map feature corresponding to a multi-floor building and determine a default floor for the multi-floor building. The method may further provide the outdoor map data and data defining a widget to the client device in response to the request for map data for the specified geographic area and the specified zoom level. The widget may include one or more of an indication of the default floor, an indication of a number of floors for the multi-floor building, a description of a bounding box for one or more floors of the multi-floor building, and names for each floor of the multi-floor building.

In a second embodiment, a mapping system may be configured to enable quick transitions to indoor map data from a base map displaying outdoor map data. The system may comprise a remote mapping server including a processor and a memory, the memory including instructions executed. A first instruction may receive, from the client device, a request for map data for a specified geographic area and a specified zoom level. A second instruction may retrieve outdoor map data for the requested geographic area at the zoom level. The outdoor map data may correspond to externally-visible physical entities. A third instruction may determine that the outdoor map data includes a map feature corresponding to a multi-floor building, and a fourth instruction may determine a default floor for the multi-floor building. A fifth instruction may provide the outdoor map data and data defining a widget to the client device in response to the request for map data for the specified geographic area and the specified zoom level. The widget may include one or more of an indication of the default floor, an indication of a number of floors for the multi-floor building, a description of a bounding box for one or more floors of the multi-floor building, and names for each floor of the multi-floor building.

In a third embodiment, a tangible computer-readable medium may include non-transitory computer readable instructions stored thereon for enabling quick transitions to indoor map data from a base map displaying outdoor map data. A first instruction may receive, from the client device, a request for map data for a specified geographic area and a specified zoom level. A second instruction may retrieve outdoor map data for the requested geographic area at the zoom level. The outdoor map data may correspond to externally-visible physical entities. A third instruction may determine that the outdoor map data includes a map feature corresponding to a multi-floor building, and a fourth instruction may determine a default floor for the multi-floor building. A fifth instruction may provide the outdoor map data and data defining a widget to the client device in response to the request for map data for the specified geographic area and the specified zoom level. The widget may include one or more of an indication of the default floor, an indication of a number of floors for the multi-floor building, a description of a bounding box for one or more floors of the multi-floor building, and names for each floor of the multi-floor building.

In a fourth embodiment, a computer apparatus may enable quick transitions to indoor map data from a base map displaying outdoor map data. The apparatus may include means to receive, from the client device, a request for map data for a specified geographic area and a specified zoom level. The apparatus may also include means to retrieve outdoor map data for the requested geographic area at the zoom level. The outdoor map data may correspond to externally-visible physical entities. The apparatus may also include means to determine that the outdoor map data includes a map feature corresponding to a multi-floor building, means to determine a default floor for the multi-floor building, and means to provide the outdoor map data and data defining a widget to the client device in response to the request for map data for the specified geographic area and the specified zoom level. The widget may include one or more of an indication of the default floor, an indication of a number of floors for the multi-floor building, a description of a bounding box for one or more floors of the multi-floor building, and names for each floor of the multi-floor building.

The figures depict embodiments of the present invention for purposes of illustration only. One skilled in the art will readily recognize from the following discussion that alternate embodiments of the structures and methods illustrated herein may be employed without departing from the principles of the invention described herein.

DETAILED DESCRIPTION

A map data server provides certain information about the available indoor map data as metadata accompanying map data for drawing a base map (i.e., the foundational layer of a digital map for a given zoom level). For example, map data can include vectors for drawing a footprint of a building, and the metadata can include an indication of how many floors the building has, and for how many of these floors detailed indoor map data is available. A mapping application running on the client can use this indication to properly display a floor picker (e.g., a widget that displays selectable floor numbers for activating a display of the corresponding floor). Further, the metadata accompanying map data can include a bounding box, or a bounding polygon, for one or more floors. The mapping application can use these bounding shapes to properly reposition the viewport as map data for a new floor is being loaded, for example. Still further, the metadata can include names of floors to appear as floors listed in an elevator of the building, for example. More generally, the metadata can include information that helps the mapping application make transitions from an external view of a building to the indoor view of the building, as well as make transitions between floors more smooth.

As discussed in more detail below, metadata in some implementations accompanies particular map features. Thus, for example, a building can be described as an individual map feature. The description of the map feature can include the external geometry of the building in a vector graphics format, textures to be applied to the building geometry, text labels, etc. Metadata accompanying this map feature can include an overview of the available indoor data discussed above.

Additionally, a mapping application of the present disclosure can receive indoor floor data for the default floor of a multi-floor building as part of a base map. The map data server in this case can annotate the indoor floor data to allow the mapping application on the client device to easily remove this indoor map data, apply a different style to the indoor map data, or other actions. For example, the base map can include, among other map features, an external outline of a large indoor shopping mall. The indoor floor data can include outlines of stores, labels, icons indicating the locations of elevators and restrooms, and other indoor features. For each indoor feature, the server may specify that the feature is an indoor feature associated with a certain floor.

Figure 2:
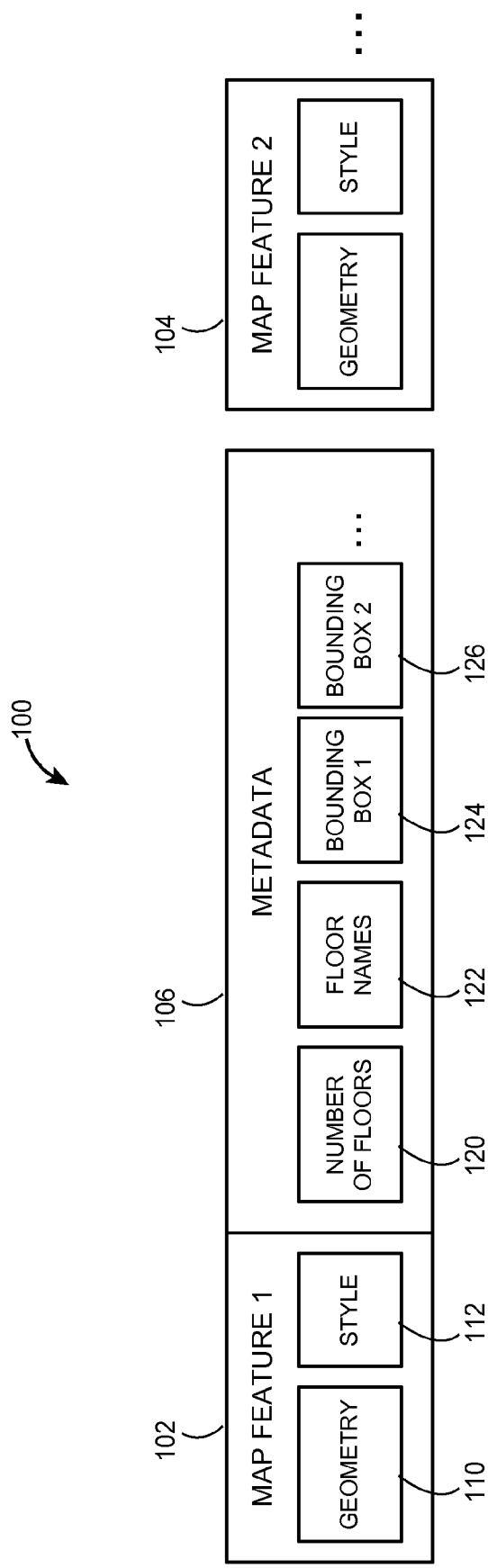
FIG. 2 is a block diagram of an example description of a map tile including multiple map features and metadata with indoor information for some of the map features, which a map data server can transmit to a client device.
Figure 3:
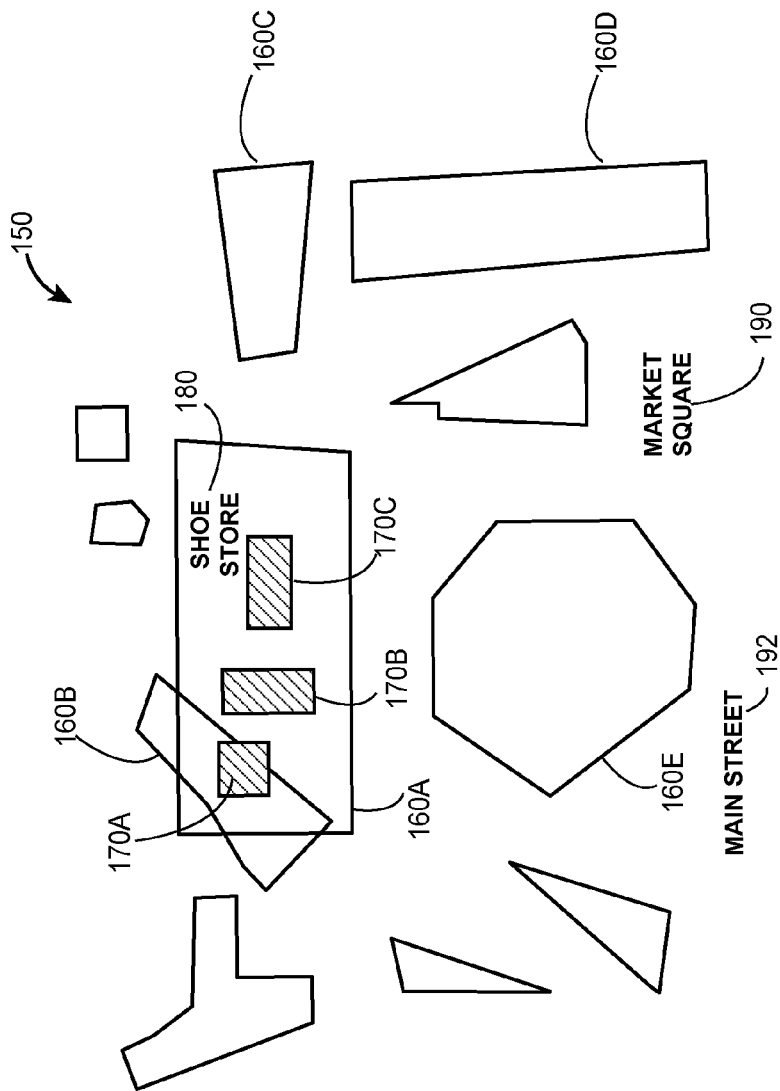
FIG. 3 schematically illustrates a map tile that includes both outdoor map features and indoor map features, which a map data server can transmit to a client device.
Figure 3:
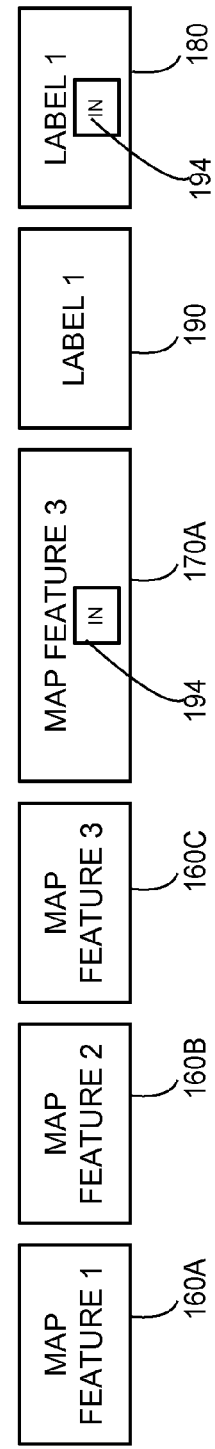

These techniques are discussed in more detail below with reference to FIGS. 1-5. In particular, an example system in which a map data server can provide indoor map information to a client device is illustrated FIG. 1, example formats and uses of this information are schematically illustrated in FIGS. 2 and 3, and flow diagrams of example methods for exchanging indoor map information are illustrated in FIGS. 4 and 5.

System Overview

Figure 1:
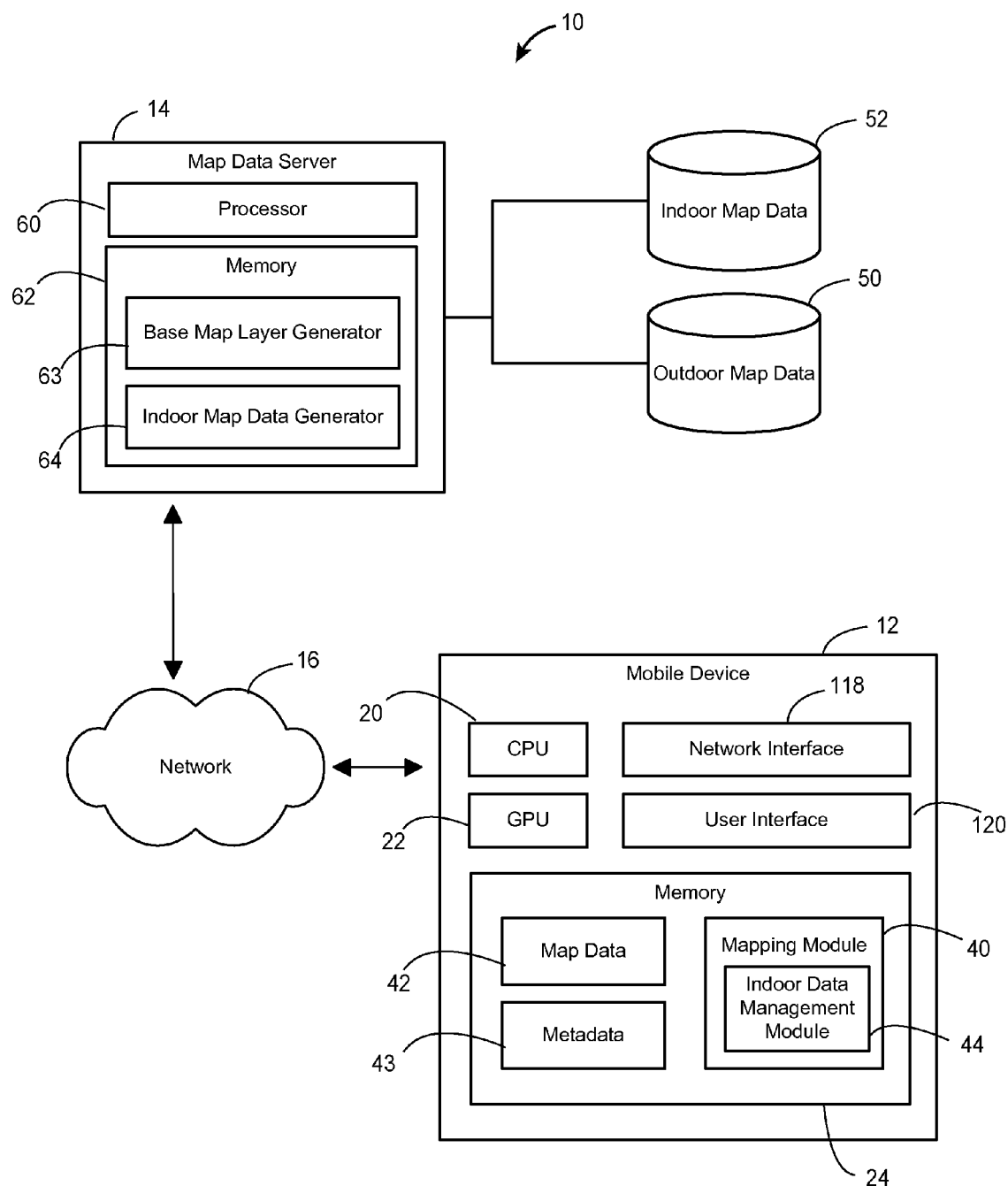
FIG. 1 is a block diagram of an example system in which techniques for providing indoor map data to a client device are implemented.

Referring first to FIG. 1, a system 10 includes a computing device 12 coupled to a map server 14 via a communication network 16. The computing device 12 can be, for example, a laptop computer, a tablet computer, a smartphone, etc. In the embodiment illustrated in FIG. 1, the computing device 12 includes a central processing unit (CPU) 20, a graphics processing unit (GPU) 22, a computer-readable memory 24, a network interface 118, and a user interface 120 including a touch interface. In various implementations, the touch interface can include a touchpad over which the user moves his or her fingers while looking at a separately provided screen, a touchscreen where the user places his or her fingers directly over the image being manipulated or over a displayed control being activated (e.g., a displayed keyboard), etc. The memory 24 is a computer-readable non-transitory storage device that may include both persistent (e.g., a hard disk) and non-persistent (e.g., RAM) memory components, and may store instructions executable on the CPU 20 and/or the GPU 22 that make up a mapping software module 40 and map data 42 on which the mapping module 40 operates. The mapping software module 40 includes an indoor data management module 44 that allows users to easily inspect internal features of multi-story buildings.

The mapping software module 40 according to various implementations operates as a separately executable software application, a plugin that extends the functionality of another software application such as a web browser, an application programming interface (API) invokable by a software application, etc. The instructions that make up the mapping software module 40 may be compiled and executable on the CPU 20 and/or the GPU 22 directly, or not compiled and interpreted by the CPU 20 at runtime. Further, the indoor data management module 44 may be provided as an integral part of the mapping software module 40 or as a separately installable and downloadable component.

Depending on the implementation, the map data 42 may be in a raster format, such as Portable Network Graphics (PNG), a vector graphics format (based on mathematical descriptions of geometric shapes), or any other suitable format. The map data 42 in some cases is divided into map tiles, or portions of a map image having a certain fixed size, such as 256 by 256 pixels. In operation, the mapping module 40 receives the map data 42 from the map server 14, renders a map image based on the map data, and causes the map image to be displayed via the user interface 30. When the mobile device 12 receives the map data 42 already rasterized, the mapping module 40 renders the map image by selecting and combining the proper rasterized tiles. However, if the map data 42 is in a vector graphics format, the mapping module 40 interprets the descriptions of various shapes to generate the corresponding raster images. The mapping module 40 also adjusts the displayed image and requests new map data, when necessary, in response to user input received via the user interface 30. More specifically, the user may change the zoom level, pan across the map, select a different map type (e.g., traffic map, terrain map), and otherwise interact with the map.

In an example scenario, the map server 14 receives a request that specifies the geographic area, the zoom level, and the map type. In response to the received request, the map server 14 retrieves outdoor map data and indoor map data from an outdoor map database 50 and an indoor map database 52, respectively. The map server 14 then provides the outdoor map data, the indoor map data, and appropriate indications of how certain portions of the outdoor map data and the indoor map data are linked, to the computing device 12 as part of the map data 42. In another implementation, however, indoor and outdoor map data can be stored in a single database and/or provided by a common server.

When provided in a vector graphics format, outdoor map data may specify or define graphic representations of individual map elements representing such physical entities as roads, parks, bodies of water, external walls of buildings, and other natural and artificial objects visible outside, e.g., from above or at a street level. In a raster format, map elements typically are embedded into the same image. Outdoor map data also may include text-based data for displaying various labels such as street names or names of landmarks. In general, outdoor map data may be used by a computing device 12 to generate 2D images or 3D images, and may include schematic data, photographic images, or both.

Indoor map data may specify or define internal features of buildings such as the layout of internal walls or dividers, names of people, businesses, and organizations occupying different portions of a building, locations of elevators, escalators, restrooms, etc. For multi-story buildings, the indoor map data may specify internal features on a per-floor basis. Similar to outdoor map data, indoor map data may include both graphics content and non-graphics (e.g., text) content, and the graphics content may include schematic illustrations, photographic images, interactive and non-interactive icons, etc.

Certain portions of the outdoor map data may be logically linked to respective portions of indoor map data. In particular, certain map elements displayed on a map may be linked to indoor data that typically is not displayed on the map without an additional user request. In other words, certain map elements may be associated with additional map data that is not part of the map image typically displayed for the specified geographic region, map type, and zoom level. Referring to the map data 42, the map server 14 can provide outdoor map data as a collection of separate data structures, each containing a vector-based description of a map element, text-based label data, and metadata that further contains a unique identifier of another data structure storing the corresponding indoor map data. If the outdoor map data included in the map data 42 is rasterized, the unique identifier of a data structure storing indoor map data can be provided for a particular set of coordinates in the raster image. In either case, the mapping software module 40 can display the outdoor map data and provide interactive controls for activating the display of relevant indoor map data.

As a more specific example, according to one implementation, the map server 14 provides, as part of outdoor map data, external representations of buildings in the form of low-detail three-dimensional (3D) outlines. The mapping software module 40 superimposes these 3D outlines over the two-dimensional (2D) map. In another implementation, the map server 14 provides 3D mesh descriptions of buildings along with photographic imagery for texturing the corresponding 3D meshes. Using this type of map data, the mapping software module 40 can generate realistic, highly detailed external representations of buildings. In yet another implementation, the map server 14 provides merely 2D outlines, or "footprints" of buildings on a 2D map. A user can tap or click on these 2D or 3D external representations of buildings to instruct the mapping software module 40 to display the internal features of the buildings in an expanded format.

With continued reference to FIG. 1, the map server 14 may include a processor 60 and a memory 62 that stores a base map layer generator 63 and an indoor map data generator 64 made up of instructions executable on the processor 60. The computing device 12 and the map server 14 may communicate in a client-server mode, where the computing device 12 sends requests for map data to the map server 14, and the map server 14 provides map data in response to these requests. More particularly, the base map layer generator 63 in operation causes instructions stored in a memory and executed on a processor to receive requests for map data from the computing device 12, identify and retrieve the requisite map data from the outdoor map database 50 and/or the indoor map database 52, format response messages that contain the map data, and cause the response messages to be transmitted to the computing device 12 via the network 16. The network 16 may be a wide area network (WAN) such as the Internet, a local area network (LAN), or any other suitable type of a computer network.

According to the implementations discussed below, the base map layer generator 63 includes map data for the default floor in the description of tiles that make a base map. The indoor map data generator 64 generates metadata including an overview of the available indoor map data for some of the map features. Depending on the implementation, the map data server 14 can include one or both of the components 63 and 64.

For simplicity, FIG. 1 illustrates the map server 14 as only one instance of a server device. However, according to some implementations, the map server 14 may include a group of one or more map server devices that are each equipped with one or more processors and capable of operating independently of the other map server devices. Map server devices operating in such a group can process requests from the computing device 12 individually (e.g., based on availability), in a distributed manner where one operation associated with processing a request is performed on one map server device while another operation associated with processing the same request is performed on another map server device, or according to any other suitable technique. For the purposes of this discussion, the term "map server" may refer to an individual map server device or to a group of two or more map server devices.

Enabling Quick Display Transitions Between Indoor and Outdoor Map Data

FIG. 2 is a block diagram of an example description of a map tile 100 that includes multiple map features 102, 104, etc. In an example scenario, the map data server 14 transmits map data to the client device 12 for rendering a digital map using the map tile 100 as a communication unit. In general, however, map data need not be divided into map tiles, and any other grouping of map data can be used.

The map tile 100 includes metadata for some of the map features. In the illustrated example, metadata 106 accompanies the map feature 102. The map feature 102 includes a description of geometry 110 (e.g., in a vector graphics format) and a style identifier 112. For example, the style identifier 112 can store an identifier of a style, the definition of which (line width, fill color, outline color, etc.) is provided elsewhere in the map tile 100 or even in a separate communication unit sent to the client device. The metadata 106 stores a number of floors indicator 120 (e.g., "6," "25"), floor names 122 (e.g., "ground floor," "first floor"), and bounding boxes 124 and 126 for floors N and M, respectively. More generally, the metadata 106 can include more or less information.

Next, FIG. 3 schematically illustrates a map tile 150 that includes both outdoor map features 160 and indoor map features 170 which the map data server 14 can transmit to the client device 12 and which the client device 12 can subsequently render. More specifically, the map data server 14 can provide the outdoor map features 160 (i.e., buildings 160A, 160B, 160C, 160D, 160E) and the indoor map features 170 (i.e., stores, floors, internal building structures, or other indoor features 170A, 170B, and 170C) as part of a base map tile. The client device 12 can overlay traffic, weather, transit, and other types of data on the base map tile 150. It is noted that the technique of FIG. 3 can be implemented in a communication system together with the technique of FIG. 2, or these two techniques can be implemented independently in respective different embodiments of a communication system.

Each of the indoor map features 170 can be provided in a vector graphics format, similar to the outdoor map features 160. In addition to shapes representing internal hallways, wall dividers, rooms, etc., the map tile 150 can include labels 180 for indoor map features. By contrast, labels 190 and 192 identify street-level features. More generally, the map tile 150 can include various types of data for rendering an indoor digital map.

The map data server 14 can select the indoor map features 170 based on the default configuration of the building with the footprint represented by the map feature 160A. For example, the building represented by the map feature 160A can be a four-story shopping mall, with separate sets of map features defined for each floor. The indoor map database 52 (see FIG. 1) can store an indication that the default floor for this building is the second floor, for example. The default floor of a building need not be the ground floor as the ground floor may be occupied by a garage that is relatively uninteresting to users. The map data server 14 can (i) query the indoor map database 52 to determine that the ground floor is the default floor, (ii) query the indoor map database 52 to retrieve indoor map features specific to the ground floor of the building (in this case, the indoor map features 170 and the label 180), and (iii) incorporate the indoor map features 170 and the label 180 into the base map that also includes the outdoor map features 160.

In another implementation, a server (which may be the map data server 14 or another server) can combine outdoor map data with default-floor indoor map data ahead of time, for each map tile. In other words, map tiles are pre-computed to enable the map data server 14 to more quickly provide map tiles to clients upon request.

When the user wishes to view a different floor of the building, the mapping module 40 can send the corresponding request for floor data for another floor that is not the default floor to the map data server 14. The server may then retrieve the indoor map features for the new floor. Depending on the implementation, the indoor data management module 44 can overlay the new floor data over the base map or remove and replace the individual map features 170.

As further illustrated in FIG. 3, to enable the client device 14 to selectively operate on the indoor map data, indoor map features 170 and labels 180 are provided with indoor map data indicators 194. The indoor data management module 44 can use the indicator 194 to manage indoor map features separately and render these features in a different style, highlight indoor map features without highlighting other map features in response to a user request or an automated event (e.g., a search query), apply other visual effects, etc. The indoor map indicators 194 may also correspond to each floor of a building (i.e., per floor) or to the building itself (i.e., per building) so that indoor data for one building may be highlighted or replaced with a different floor independent of indoor data for other nearby buildings.

In short, by providing indoor map features for the default floor in a base map tile in the manner discussed above, the map data server 14 on the one hand allows the mapping module 40 to immediately display richer content on the client device 12 and, on the other hand, allows the mapping module 40 to easily turn off the display of indoor map data, highlight the indoor map data, transition from one floor to another, etc.

Figure 4A:
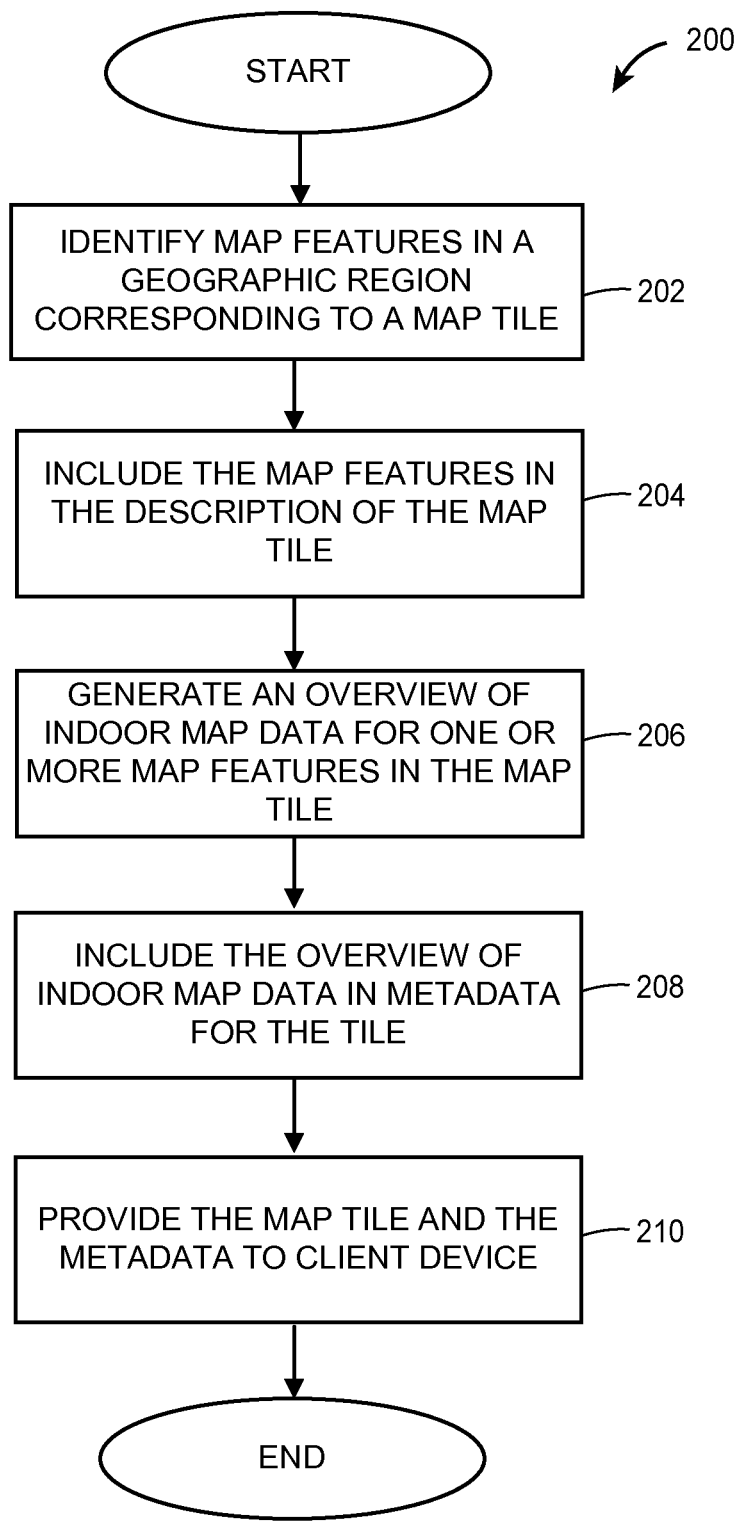
FIG. 4a is an exemplary flow diagram of a computer-implemented method for providing map data with an overview of available indoor map data to a client device.
Figure 5:
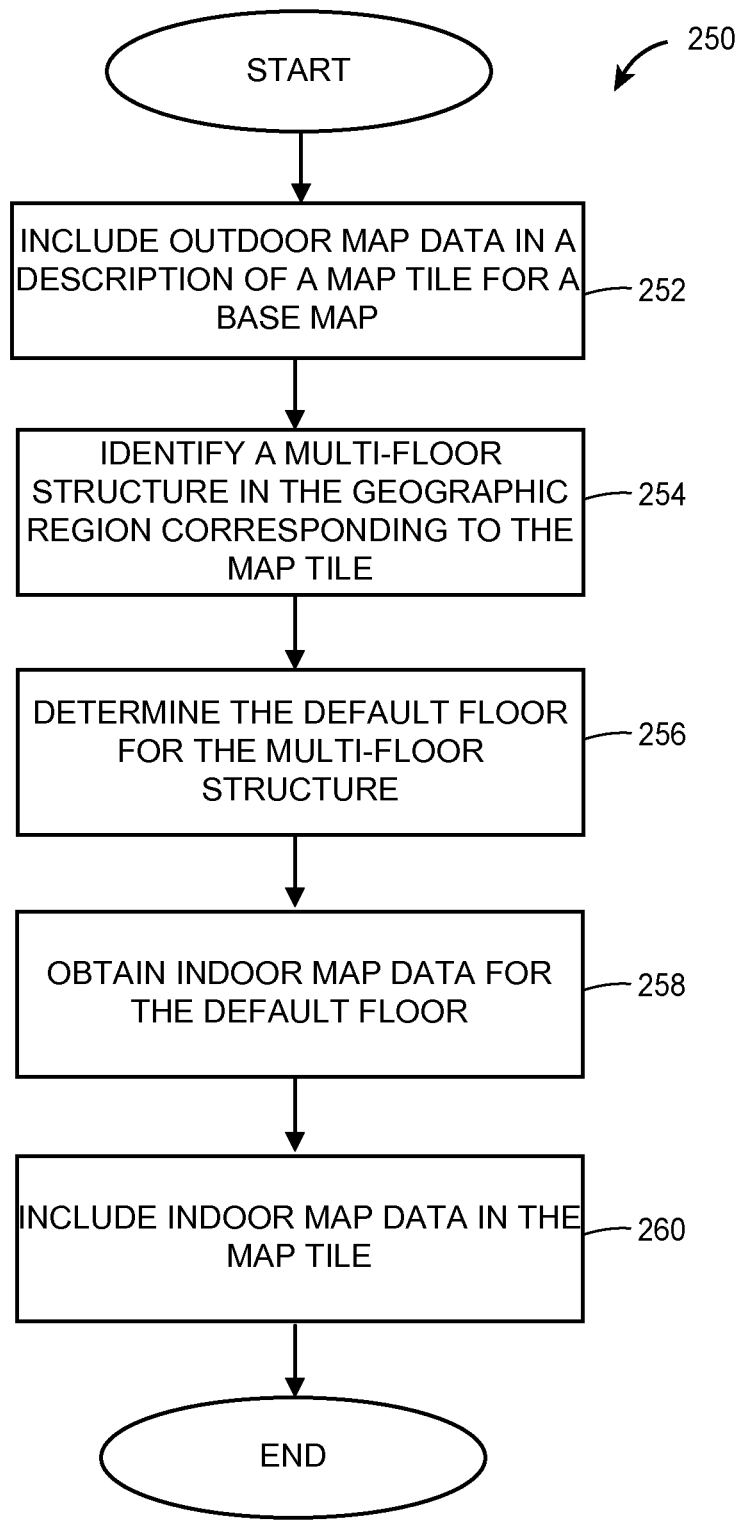
FIG. 5 is a flow diagram of an example method for providing indoor map data as part of a base map.

FIG. 4a is a flow diagram of an example method 200 for providing map data with an overview of available indoor map data to a client device. The method 200 can be implemented as a set of instructions stored on a computer-readable memory and executable on one or more processors. For example, the method 200 can be implemented in the indoor map data generator 64. In an example implementation, the method 200 is executed in response to receiving a request for map data corresponding to a specified geographic area and a specified zoom level.

At block 202, map features that belong to a map tile are identified. This step can be implemented in a batch process, if desired. The map features identified at block 202 are outdoor map features representing physical entities visible from a street or otherwise from the outside. The identified map features are included in a description of a map tile at block 204. To this end, the vector graphics format can be used, for example.

Next, at block 206, an overview of the available indoor map data for one or more features identified at block 202 is generated. The overview can include an indication of the number of floors, a description of a bounding box for one or more floors, names of the floors, etc. At block 208, the overview of the available indoor map data is included in the metadata accompanying map features. The map data and the metadata then are provided to a client device at block 210.

Figure 4B:
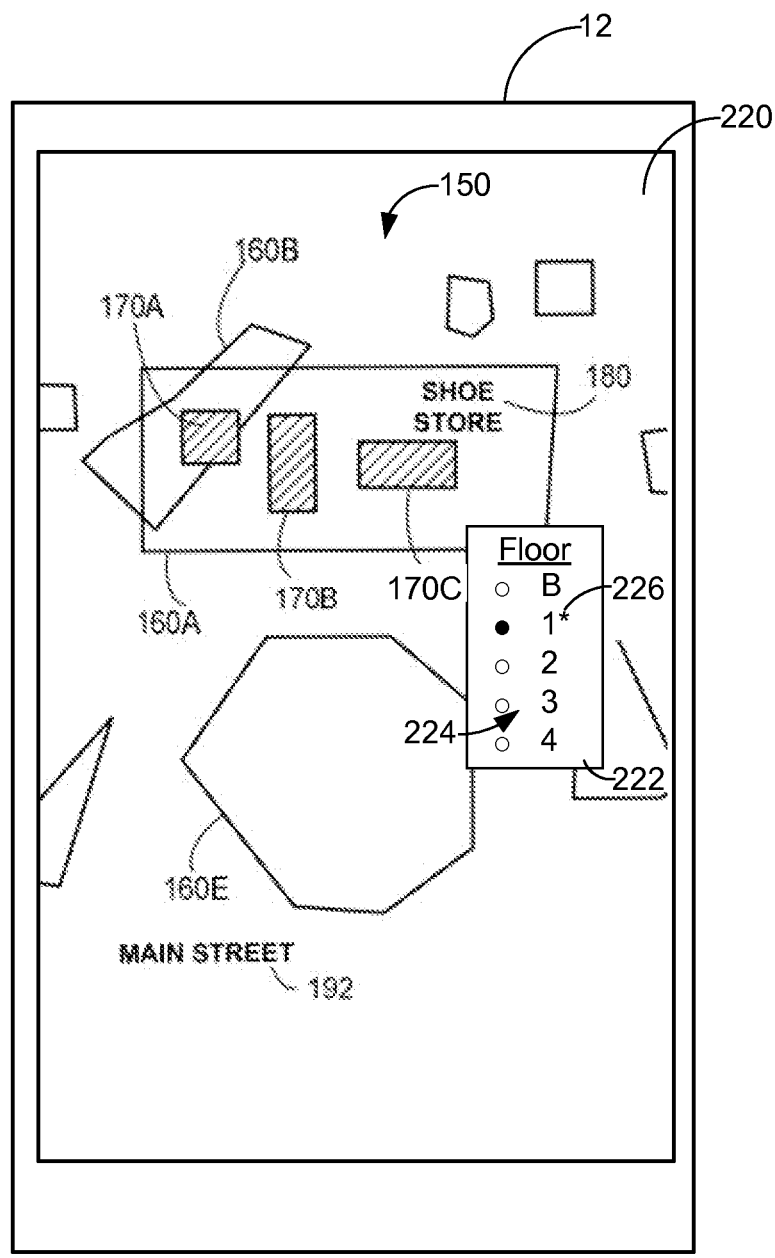
FIG. 4b is an exemplary user interface for a mapping module executing on a client computing device displaying an overview of available indoor map data.

FIG. 4b is an example of a user interface 220 for the mapping module 40 as displayed by a client device 12 after being provided to the client device at block 210. The user interface may display both the map data (e.g., map tile 150) and the metadata 106. For example, the mapping module 40 may cause the metadata 106 to be displayed as the overview or "widget" 222 including indications of which floors 224 of a selected building (e.g., building 160A which includes indoor map features) are available for viewing as a map. In some embodiments, the widget 222 may also include an indication of a default floor 226 as indicated in the metadata 106 provided with the map data at block 210. In still further embodiments, the widget 222 may include a slider bar or other scrolling feature for a user to manipulate and display other available floor or indoor feature selections 224.

Next, FIG. 5 depicts a flow diagram of an example method 250 for providing indoor map data as part of a base map. In some embodiments, the method 250, in whole or in part, can be stored as tangible computer-executable instructions of the base map layer generator 63 within the memory 62 of the map data server 14 and executed by the processor 60, for example. In other embodiments, the method 250, in whole or in part, can be stored as tangible computer-executable instructions of the mapping module 40 within the memory 24 of the client device 12 and executed by the CPU 20 or GPU 22, for example. In still further embodiments, the method 250 can be stored as a combination of tangible computer-executable instructions within the memory 62 of the map data server 14 and/or the client device 12 and respectively executed by the processor 60, the CPU 20, and/or the GPU 22. The method 250 also can be implemented as a set of instructions stored on a computer-readable memory and executable on one or more processors.

The method 250 begins at block 252, where outdoor map features 170, indoor map features 160, and metadata 106 for a geographic area are included in a base map for a certain map tile 150 (FIG. 4b) and received and displayed at a client device. At block 254, the method 250 identifies a multi-floor building 160A or other outdoor feature in a geographic region corresponding to the map tile 150. At block 256, the method 250 uses the received metadata 106 to determine the default floor 226 of the structure 160A. For example, with reference to FIG. 4b, a base map includes a map tile 150 and building 160A. The metadata 106 may indicate that the first floor of the building 160A is the default floor and the method 250 may cause the indication for the default floor 226 to appear in the widget 222. Next, the method 250 may retrieve indoor map data for the default floor 226 from a database (block 258) and included in the map tile (260). Blocks 254-260 can be executed multiple times if the map tile includes multiple multi-floor structures for which indoor map data is available.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for providing indoor map data to a client device through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method in a network server for enabling quick transitions to indoor map data from a base map displaying outdoor map data, the method comprising:
   receiving, by one or more processors from the client device, a request for map data for a specified geographic area and a specified zoom level;
   retrieving, by one or more processors, outdoor map data for the requested geographic area at the zoom level, wherein the outdoor map data including a plurality of features corresponding corresponds to externally-visible physical entities;

determining, by one or more processors, that the outdoor map data includes a map feature corresponding to a multi-floor building;

determining, by one or more processors, a default floor for the multi-floor building;

generating, by one or more processors, a single map tile including (i) descriptions of geometry for the plurality of features and (ii) metadata including an overview of available indoor map data for the feature corresponding to the multi-floor building, the overview including one or more of an indication of the default floor, an indication of a number of floors for the multi-floor building, a description of a bounding box for one or more floors of the multi-floor building, and names for each floor of the multi-floor building; and providing the map tile to the client device in response to the request, for rendering a base map of the specified geographic area and generating, using the metadata, a widget for activating a display of a selected floor, wherein determining the default floor includes selecting a floor other than a ground floor of the multi-floor building based on whether the default floor is likely to be interesting to a user.

2. The method of claim 1, further comprising receiving, from the client device, a request for further indoor map data for a floor other than the default floor after providing the map tile to the client device in response to the request for map data for the specified geographic area and the specified zoom level.

3. The method of claim 2, further comprising receiving the request for further indoor map data via the widget.

4. The method of claim 1, wherein the outdoor map data defines graphic representations of individual map elements including one or more of a road, a park, a body of water, and an external wall of a building.

5. The method of claim 1, further comprising retrieving indoor map data for the default floor, wherein the indoor map data corresponds to physical entities disposed on the default floor of the multi-floor building.

6. The method of claim 5, further comprising incorporating the retrieved indoor map data into the base map, the base map including the outdoor map data.

7. The method of claim 1, wherein the indoor map data defines graphic representations of internal features of buildings including one or more of a layout of internal walls corresponding to a building, names of people, names of businesses, positions of organizations within the building, elevators, escalators, and restrooms.

8. The method of claim 6, wherein the provided outdoor map data includes a logical link to the indoor map data.

9. The method of claim 1, further comprising:

querying an indoor map database to determine the default floor for the multi-floor building; and querying the indoor map database to retrieve indoor map features specific to the default floor of the building.

10. A mapping system configured to enable quick transitions to indoor map data from a base map displaying outdoor map data, the system comprising:

a remote mapping server including a processor and a memory, the memory including instructions executed on the processor to:

receive, from the client device, a request for map data for a specified geographic area and a specified zoom level;

retrieve outdoor map data for the requested geographic area at the zoom level, wherein the outdoor map data including a plurality of features corresponding corresponds to externally-visible physical entities;

determine that the outdoor map data includes a map feature corresponding to a multi-floor building;

determine a default floor for the multi-floor building;

generate a single map tile including (i) descriptions of geometry for the plurality of features and (ii) metadata including an overview of available indoor map data for the feature corresponding to the multi-floor building, the overview including one or more of an indication of the default floor, an indication of a number of floors for the multi-floor building, a description of a bounding box for one or more floors of the multi-floor building, and names for each floor of the multi-floor building; and provide the map tile to the client device in response to the request, for rendering a base map of the specified geographic area and generating, using the metadata, a widget for activating a display of a selected floor, wherein determining the default floor includes selecting a floor other than a ground floor of the multi-floor building based on whether the default floor is likely to be interesting to a user.

11. The system of claim 10, wherein the memory includes a further instruction executed on the processor to receive, from the client device, a request for further indoor map data for a floor other than the default floor after executing the instruction to provide the map tile to the client device in response to the request for map data for the specified geographic area and the specified zoom level, the request for further indoor map data received via the widget.

12. The system of claim 10, wherein the outdoor map data defines graphic representations of individual map elements including one or more of a road, a park, a body of water, and an external wall of a building.

13. The system of claim 10, further comprising retrieving indoor map data for the default floor, wherein the indoor map data corresponds to physical entities disposed on the default floor of the multi-floor building.

14. The system of claim 10, wherein the memory includes a further instruction executed on the processor to incorporate the retrieved indoor map data into the base map, the base map including the outdoor map data.

15. The system of claim 10, wherein the indoor map data defines graphic representations of internal features of buildings including one or more of a layout of internal walls corresponding to a building, names of people, names of businesses, positions of organizations within the building, elevators, escalators, and restrooms.

16. The system of claim 10, wherein the provided outdoor map data includes a logical link to the indoor map data.

17. A tangible computer-readable medium including non-transitory computer readable instructions stored thereon for enabling quick transitions to indoor map data from a base map displaying outdoor map data, the instructions to:

receive, from the client device, a request for map data for a specified geographic area and a specified zoom level;

retrieve outdoor map data for the requested geographic area at the zoom level, wherein the outdoor map data including a plurality of features corresponding corresponds to externally-visible physical entities;

determine that the outdoor map data includes a map feature corresponding to a multi-floor building;

determine a default floor for the multi-floor building; generate a single map tile including (i) descriptions of geometry for the plurality of features and (ii) metadata including an overview of available indoor map data for the feature corresponding to the multi-floor building the overview including one or more of an indication of the default floor, an indication of a number of floors for the multi-floor building, a description of a bounding box for one or more floors of the multi-floor building, and names for each floor of the multi-floor building; and provide the map tile to the client device in response to the request for rendering a base map of the specified geographic area and generating using the metadata a widget for activating a display of a selected floor, wherein determining the default floor includes selecting a floor other than a ground floor of the multi-floor building based on whether the default floor is likely to be interesting to a user.

18. The tangible computer readable medium of claim 17, further comprising an instruction to receive, from the client device, a request for further indoor map data for a floor other than the default floor for execution after the instruction to provide the map tile to the client device in response to the request for map data for the specified geographic area and the specified zoom level, the request for further indoor map data received via the widget.

19. The tangible computer readable medium of claim 17, wherein the outdoor map data defines graphic representations of individual map elements including one or more of a road, a park, a body of water, and an external wall of a building.

20. The tangible computer readable medium of claim 17, further comprising an instruction to retrieve indoor map data for the default floor, wherein the indoor map data corresponds to physical entities disposed on the default floor of the multi-floor building.

21. The tangible computer readable medium of claim 17, wherein the provided outdoor map data includes a logical link to the indoor map data.

\* \* \* \* \*